United States Patent [19]

Gottschald

[11] Patent Number: 5,588,899
[45] Date of Patent: Dec. 31, 1996

[54] APPARATUS FOR GRINDING SPECTACLE LENSES

[75] Inventor: Lutz Gottschald, Meerbusch, Germany

[73] Assignee: Wernicke & Co. GmbH, Düsseldorf, Germany

[21] Appl. No.: 433,247

[22] Filed: Apr. 28, 1995

[30] Foreign Application Priority Data

Apr. 28, 1994 [DE] Germany ............ 44 14 784.8

[51] Int. Cl.$^6$ .................................... B24B 49/00
[52] U.S. Cl. .................. 451/5; 451/6; 451/9; 451/11; 451/43
[58] Field of Search ................ 451/5, 6, 9, 42, 451/43, 44, 10, 11, 240, 255, 256

[56] References Cited

U.S. PATENT DOCUMENTS

| | | |
|---|---|---|
| 4,656,590 | 4/1987 | Ace ............................. 451/6 |
| 4,737,918 | 4/1988 | Langlois et al. ............ 451/6 |
| 5,053,971 | 10/1991 | Wood et al. ............... 451/43 |
| 5,148,637 | 9/1992 | Byron ......................... 451/43 |
| 5,283,980 | 2/1994 | Lohrenz et al. ............. 451/6 |
| 5,454,194 | 10/1995 | Gottschald ................. 451/11 |

FOREIGN PATENT DOCUMENTS 226349  4/1991  European Pat. Off. .
4127094 2/1993  Germany .

*Primary Examiner*—Bruce M. Kisliuk
*Assistant Examiner*—Eileen P. Morgan
*Attorney, Agent, or Firm*—Robert W. Becker & Associates

[57] ABSTRACT

An apparatus for peripheral grinding of a lens has at least one CNC-control device for grinding of the lens blanks according to a selected contour of the lens to be produced from the lens blank. The CNC control device has at least one grinding wheel, at least one rotatable holder for a lens blank, at least one input device for inputting the optical specifications of the lens to be produced, and a controller for controlling grinding of the lens blank according to the selected contour. At least one manipulation device for receiving and positioning the lens blank according to the optical specifications is provided. An opto-electronic detecting device for detecting markings of the lens blank is provided. The detecting device is arranged in the vicinity of the manipulation device. A first control unit, controlling the detecting device, and a second control unit, controlling the manipulation device, cooperate with one another for precisely positioning the lens blank on the holder of the grinding machine.

11 Claims, 2 Drawing Sheets 5,588,899

APPARATUS FOR GRINDING SPECTACLE LENSES

BACKGROUND OF THE INVENTION

The present invention relates to an apparatus for grinding at least the periphery of spectacle lenses. The apparatus comprises at least one grinding wheel, at least one rotatable holder for a lens blank, and at least one device for CNC (computerized numerical control) controlled grinding of the blank according to selected optical specifications and/or a selected contour of the lens to be produced.

Such a device is known from German Offenlegungsschrift 41 27 094. The disclosed apparatus comprises at least one input device connected to the control device for inputting optical specifications of the lens to be produced and/or for the decentralization values of the predetermined contour and/or the position of the optical axis and/or the position of the reading portion of the lens with respect to the optical axis as well as at least one manipulation device connected to the control unit for taking up and positioning the lens blank according to the specifications and values input with the inputting device and for a corresponding precise positioning of the lens blank on the holder. The manipulation device picks up one of the lens blanks at the edge and guides it into the open holder of the grinding machine. The manipulation device is controlled such that the lens blank with respect to the rotational axis of the holder is positioned corresponding to the input decentralization data. When the holder subsequently clamps the lens blank and the manipulation device releases the lens blank, the grinding process can be preformed according to the selected optical specifications and/or according to the selected contour of the lens to be produced while taking into consideration the decentralization values. When the holder is designed such that it can clamp the lens blank so as to be rotationally fixed, after having been exactly positioned by the manipulation device, it is no longer necessary to provide for a blocking of the lens blank before insertion into the holder of the grinding machine. In addition to or instead of the decentralization values it is also possible to take into consideration via the input device the axial position of the selected contour of a lens to be produced with cylindrical or prismatic grinding and/or the optical specifications of the lens to be ground, i.e., for bifocal or trifocal lenses the position of the reading portion.

In order to be able to automatically align the lens blank the known apparatus may be provided with a vertex refractometer positioned within the operating range of the manipulation device. This vertex refractometer comprises a sensor and a data connection to the control device and is used for positioning at the optical center point the lens blank held by the manipulation device and for registering the data of the optical center point for the subsequent position-exact insertion of the lens blank on the holder.

The known apparatus furthermore provides the possibility of controlling the manipulation device with machine-readable markings of the optical values provided at the lens blank. The lens blank which has been taken up by the manipulation device can be guided into the area of a sensor which then reads the optical specifications. With a data connection to the control device the position-exact insertion of the lens blank into the holder can be preformed as a function of the optical specifications that have been detected by the sensor and also as a function of the preset decentralization values and/or the optical axis position.

Furthermore, it should be mentioned that a large number of different lens blanks can be arranged within a container that is accessible to the manipulation device whereby for each of the lens blanks a machine-readable marking as an address is provided at the container which address is read by the sensor provided at the manipulation device and controls via the data connection to the control device, the removal of a lens blank from the container according to the selected optical specifications.

It is therefore an object of the present invention to provide an apparatus for grinding at least the periphery of lens blanks comprising a detection system for markings at the lens blanks which is responsive to conventional markings such as points, crosses, notches at the edge of the lens blank, or the position of a reading portion of the lens that is already ground into the lens blank.

SUMMARY OF THE INVENTION

An apparatus for peripheral grinding of a lens according to the present invention is primarily characterized by:

At least one CNC-control device for grinding the lens blank according to a selected contour of the lens to be produced from the lens blank, the CNC-control device comprising;

a) at least one grinding wheel, b) at least one rotatable holder for a lens blank, c) at least one input device for inputting the optical specifications of the lens to be produced, and d) a first control unit for controlling grinding of the lens blank according to the selected contour;

At least one manipulation device for receiving and positioning the lens blank according to the optical specifications;

An opto-electronic detecting device for detecting markings of the lens blank, the opto-electronic detecting device arranged in the vicinity of the manipulation device; and A first control unit, controlling the detecting device, and a second control unit, controlling the manipulation device, the first and the second control units cooperating for precisely positioning the lens blank on the holder.

Advantageously, the opto-electronic detecting device comprises a holding device for the lens blank, a lighting device, and CCD (charge coupled device) camera, wherein the CCD camera is connected to the first control unit and wherein the first control unit comprises an electronic picture processing and evaluating system cooperating with the second control unit.

Preferably, the opto-electronic detecting device further comprises a housing with an opening, wherein the holding device is a three-point support connected to the opening so as to project from the housing and wherein the CCD camera is positioned in the housing and is aligned with the opening and the three-point support. Advantageously, a support structure is connected to the housing. Also, a pivot arm is connected to the support structure. A soft-elastic securing element for securing the lens blank at the three-point support is provided, wherein the soft-elastic securing element is slidably connected to the pivot arm. The lighting device is in the form of an oblique illumination device.

Preferably, the manipulation device has a head member, moveable between the holder and the opto-electronic detecting device and comprising a plurality of suction elements that are positioned so as to form an arc-shaped arrangement.

Preferably, the manipulation device further comprises a vacuum source with suction lines to the suction elements. At least six of such suction elements are provided and are positioned parallel to one another. The suction elements are connected in pairs to a common one of the suction lines such that for each one of the pairs a maximum distance between the suction elements is provided. The suction lines comprise sensors for activating the second control unit of the manipulation device for setting in motion the manipulation device when at least one of the pairs of suction elements contacts the lens blank.

Preferably, the manipulation device has a head member, movable between the holder and the opto-electronic detecting device and comprising a suction head.

Expediently, the head member further comprises a plurality of suction elements that are positioned so as to form an arc-shaped arrangement. The arc-shaped arrangement is rotatable about an axis of rotation and the suction head is positioned perpendicular to the axis of rotation and is fixedly connected to the head member.

Preferably, the manipulation device further comprises a vacuum source with suction lines connected to the suction elements. At least six of the suction elements are provided and are positioned parallel to one another. The suction elements are connected in pairs to a common one of the suction lines such that for each one of the pairs a maximum distance between the suction elements is provided. The suction lines comprise sensors for activating the second control unit of the manipulation device for setting in motion the manipulation device when at least one of the pairs of suction elements contacts the lens blank.

Advantageously, the apparatus further comprises at least one container for receiving the lens blanks, the container positioned within an operating range of the manipulating device.

Preferably, the apparatus further comprises a transporting system for the at least one container.

Advantageously, the container has a rest for receiving a horizontally orientated lens blank for a left lens and a rest for receiving a horizontally orientated lens blank for a right lens of a pair of glasses.

According to the present invention, the apparatus comprises an opto-electronic detecting device for conventional markings such as points, crosses, notches at the edge of a lens blank, or the position of an already present reading portion of the lens to be manufactured. The detecting device is arranged within the operating range of the manipulation device. Furthermore a first control unit is provided at the detecting device that cooperates with a second control unit at the manipulation device for a position-exact insertion of the lens blank on the holder.

The opto-electronic detecting device can preferably be provided with a holding device for a lens blank, a lighting (illumination) device, and a CCD (charge coupled device) camera with an electronic picture processing and evaluation system in cooperation with the second control unit of the manipulation device.

A lens blank which is marked by points, crosses, notches at its periphery, and/or at least one clearly limited reading portion is introduced with the manipulation device (or manually) into the holder of the opto-electronic detecting device, subsequently the CCD camera takes a picture of the lens blank, the picture is evaluated with the electronic picture processing and evaluation system such that signals with respect to the axial position of a cylindrical or prismatic grinding and/or the position of a reading portion of the lens is determined and sent to the control unit of the manipulation device. The manipulation device then grips the lens blank so as to be exactly positioned with respect to the aforementioned optical specifications and/or decentralization values and positions the lens blank according to these specification and values on the holder of the grinding machine which subsequently performs, automatically controlled by the CNC system the selected grinding process of the lens blank.

Preferably, the opto-electronic detecting device can be comprised of a housing having an opening, a three-point support structure for the lens blank positioned in front of the opening, a CCD camera positioned within the housing below the opening, a support structure for a pivot arm, and an oblique illumination device as well as a soft-elastic securing element that is slidably connected to the pivot arm and that secures the lens blank on the three-point support structure, as well as an electronic picture processing and evaluation system.

In this arrangement, the lens blank rests, for example, horizontally on the three-point support, then the CCD camera takes a picture of the lens blank with the corresponding markings, the manipulation device takes up the lens blank according to the recorded and evaluated data, turns the lens blank by 90°, and places it on the holder of the lens blank grinding machine.

The three-point support and the pivot arm can be arranged such that the lens blank is vertically secured and in this position a picture is taken by the CCD camera in order to detect the markings at the lens blank. In this case one must ensure that the lens blank is secured by the soft-elastic securing element at the pivot arm on the three-point support before the gripping device (suction head) of the manipulation device is retracted.

The pivot arm with a soft-elastic securing member is obsolete when the three-point support is provided with suction means that secure the lens blank.

The manipulation device can be provided with a moveable head member positioned between the holder and the opto-electronic detecting device. The head member preferably comprises suction elements that are arranged in an arc-shaped arrangement and/or an individual suction head provided thereat. With the suction elements arranged in a arc-shaped arrangement the lens blank can be taken up in the area of its edges and can be placed onto the three-point support, respectively, onto the holder of the grinding machine whereby the central area about the optical axis of the lens blank remains unobstructed for being contacted by the soft-elastic securing element provided at the pivot arm of the opto-electronic detecting device, respectively, for being placed on the holder of the grinding machine.

In order to ensure that the suction elements positioned in an arc-shaped arrangement are securely holding the lens blank, it is possible to provide at least six such suction elements arranged parallel to one another at the head member whereby pairs of maximally spaced suction elements are formed pairs that are connected with a common suction line and sensors to a vacuum source (in the form of a vacuum container or a vacuum pump). The sensors actuate the motion control of the manipulation device via its control unit when at least one of the suction pairs, connected to a common suction line and sensor, are contacting the lens blank.

Instead of placing a lens blank manually into the opto-electronic detecting device, it is possible to provide a transport system with container for lens blanks at the inventive apparatus. Such a transport system is positioned within the operating range of the manipulation device. The container is preferably provided with rests for horizontally oriented left and right (in relation to a spectacle frame) lens blanks.

These lens blanks are placed into the container at a remote location of the apparatus and are transported by the transport system into the operating range of the manipulation device where the manipulation device removes individually one of the lens blanks from the container, positions it within the opto-electronic detecting device, removes it from the detecting device so as to be position-exact in order to move it to the holder of the grinding machine. After completion of grinding, the manipulation device removes the finished lens from the grinding machine and places it back into the container.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENT

Figure 1:
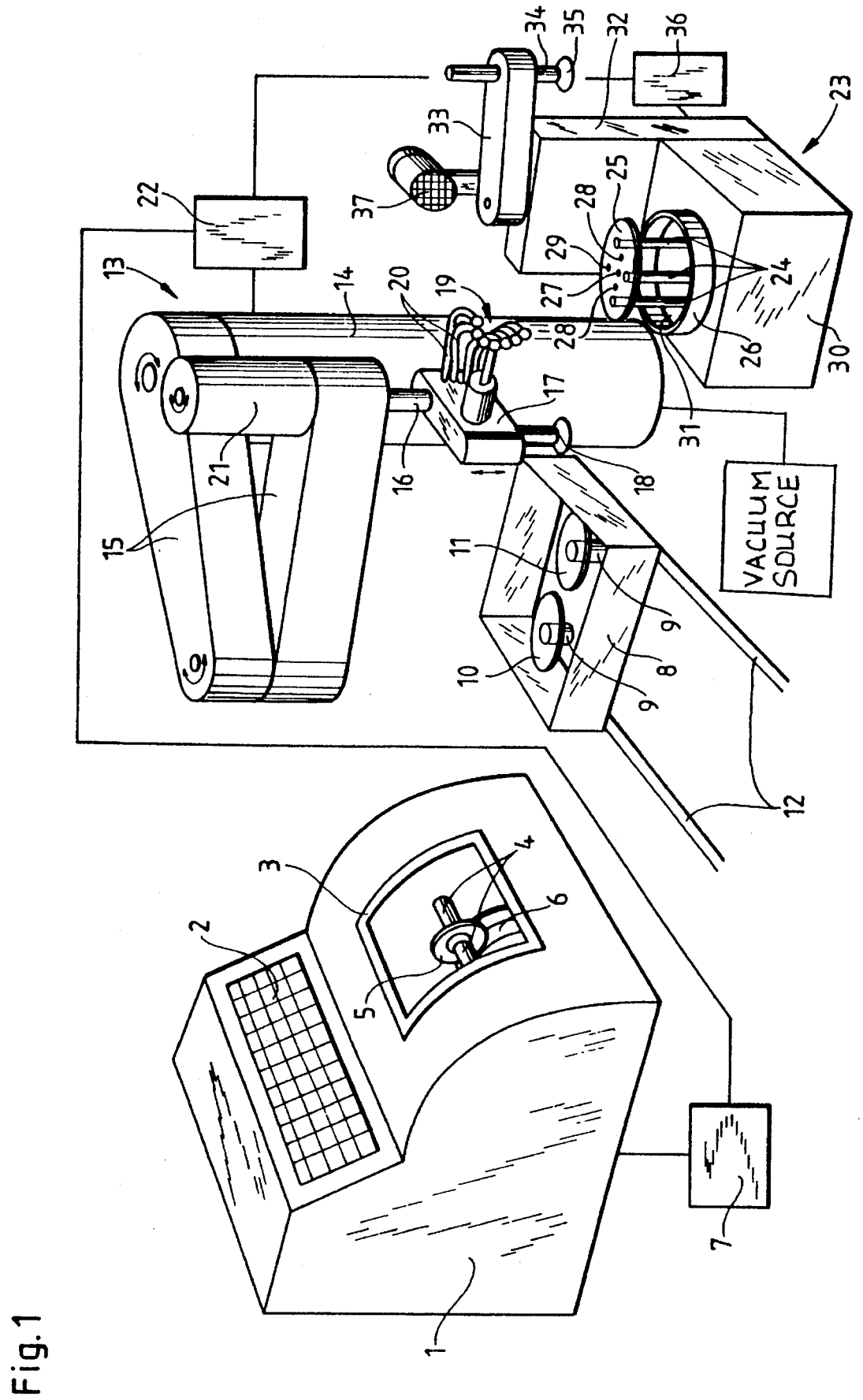
FIG. 1 shows a schematic perspective view of the inventive apparatus.

The present invention will now be described in detail with the aid of several specific embodiments utilizing FIGS. 1 through 5.

The inventive apparatus for grinding at least the periphery of spectacle lenses comprises a CNC-controlled peripheral lens grinding machine 1 having an input keyboard 2, a closure 3 with window, a holder 4 arranged behind the closure 3 and being in the form of a shaft, on which a lens blank 5 is secured for receiving the required grinding. A controller 7, which for illustration purposes is represented exterior to the peripheral lens grinding machine 1, is integrated into the grinding machine 1 and effects the grinding of the lens blank 5 according to the input and selected data and optical specifications for the lens to be manufactured.

A container 8 with two rests 9 for horizontally arranged lens blanks, i.e., a left lens blank 10 and a right lens blank 11, can be transported on guide rails 12 into the range of the manipulation device 13 with a non-represented transporting system. The manipulation device 13 comprises a stationary stand 14. At the upper end of the stand 14 arms 15 that can be pivoted about vertical axes are provided. At the free end of one of the pivotable arms 15 a rotationally and slidably displaceable guide rod 16 is provided that is connected to a head part 21 containing the drive unit for the guide rod 16. At the lower end of the guide rod 16 a further head member 17 is provided which serves as a carrier for a suction head 18 that extends perpendicularly to the head member 17. Six suction elements 19 are arranged on the head member 17 in a half-moon-shaped arrangement along an arc (arc-shaped arrangement). This arrangement is rotatable about a horizontal axis. From each of the suction elements 19 one suction line 20 extends into the head member 17 and from there, with non-represented sensors interposed, to a vacuum source (vacuum container or vacuum pump). A corresponding suction line is also provided for the suction head 18.

The head members 17 can be moved with a control unit 22 into the area of the peripheral lens grinding machine 1, of the container 8, and of the opto-electronic detecting device 23 for lens blanks. The opto-electronic detecting device 23 comprises a housing 30 with an upwardly extending opening 31. The opening is surrounded by a shield 26 from which a three-point support comprising three connecting pins 24 extends for receiving the lens blanks 25.

At one side of the housing 30 an upwardly extending support structure 32 is provided on which a pivot arm 33 is pivotably supported. This pivot arm 33 is provided at its free end with an axially displaceable guide rod 34 with a soft-elastic securing element 35 at its free end. This soft-elastic securing element 35 can be pivoted by pivoting the pivot arm 33 to a position above the lens blank 25. By lowering the guide rod 34 the soft-elastic securing element 35 is brought into abutment with the lens blank 25 and secures it on the three-point support 24.

The support structure 32 is furthermore provided with an illumination device 37 that provides an oblique illumination of the lens blank 25.

In the housing 30, below the opening 31, a CCD camera is provided which comprises an electronic picture processing and evaluation system within a control unit 36 which cooperates with the control unit 22 of the manipulation device 13.

The inventive apparatus functions as follows.

A left and a right lens blank 10, 11, which are placed manually into the container 8 having rests 9 at a location external to the shown apparatus, are sequentially picked up by the manipulation device 13 with the suction head 18 once the container 8 has been transported with the non-represented transporting device into the operation area of the manipulation device 13.

In order to simplify the drawing, FIG. 1 only shows one lens blank 25 on the three-point support 24 of the opto-electronic detecting device 23. This lens blank 25 is provided in a conventional manner with markings 27 for the optical center point of the lens blank 25 as well as with two aligned points 28 that are equally spaced from the marking 27.

A further point 29 which is positioned transversely to the line extending between the points 27, 28 provides a position definition of the lens blank 25 which is required when the lens blank has a cylindrical or prismatic grinding and/or a reading portion because the lens blank 25 must be inserted into the holder 4 of the grinding machine 1 correctly with the respect to the axial position of the cylindrical or prismatic grinding, respectively, the position of the reading portion of the lens blank.

Such a four point marking is conventionally produced by the manufacturer of the lens blank. Optionally, such a four-point marking 27, 28, 29 can be applied to the lens blank with a suitable machine, for example, a vertex refractometer.

Figure 2:
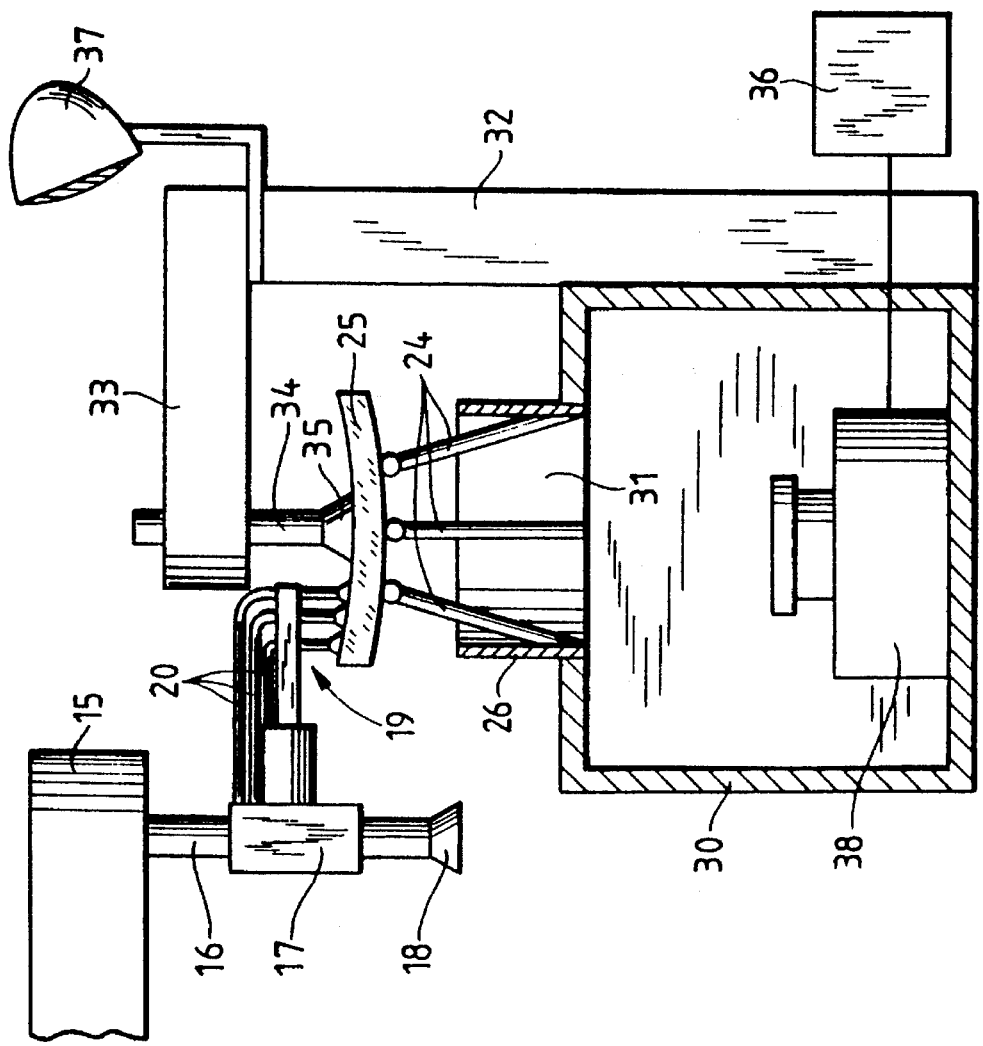
FIG. 2 shows a schematic section of the opto-electronic detecting device.

Due to the oblique illumination with the device 37, the four-point marking 27, 28, 29 is easily detected by the CCD camera 38 positioned within the housing 30. The picture processing and evaluation system of the CCD camera 38, is provided within the control unit 36, sends corresponding signals to and the control unit 22. The signals provide a command for taking up the lens blank 25. For this purpose, the pivot arm 33 together with the guide rod 34 and the soft-elastic securing member 35, is pivoted into a position above the lens blank 25 and lowered so that the lens blank 25 is fixedly positioned on the three-point support 24. Subsequently, the suction elements 19, as shown in FIG. 2, are rotated about 90° and positioned on the edge portion of the lens blank 25 so as to secure the lens blank 25.

The picture processing and evaluation system (36) has provided the control unit 22 of the manipulation device 13 with information with respect to the position of the suction elements 19 relative to the markings 27, 28, 29 so that the manipulation device 13 is able to place the lens blank 25 position-exactly onto the holding shaft 4 of the peripheral lens grinding machine 1.

Before this motion can be carried out, the pivot arm 33 with the guide rod 34 and the soft-elastic securing element 35 must be returned into the position represented in FIG. 1. Via the sensors connected to the suction lines 20 it must be checked whether at least two suction elements 19 securely hold the lens blank 25. Since the lens blank 25 conventionally has a circular shape this is always the case when picking up a lens blank from the opto-electronic detecting device 23. However, when removing a ground (finished) lens from the peripheral lens grinding machine 1 this is no longer the case, especially not when the lens that has been ground is a narrow (rectangular) lens for reading glasses. In order to ensure in this case a secure reception of the finished lens, the suction elements 19 are connected in pairs to the same suction line 20 whereby two other suction elements are always positioned between the paired suction elements 19 so that a maximum distance between the paired suction elements 19 is ensured.

While the CCD camera 38 observes the lens blank 25, the manipulation device 13 can already take up a finished-ground lens 5 for removal from the peripheral lens grinding machine 1 and return it to the container 8. It is also possible that a plurality of peripheral lens grinding machines or machines for grinding the optical surfaces are positioned within the operating range of the manipulation device 13.

In the shown embodiment the suction head 18 at the head member 17 serves to remove a lens blank 25 from the container 8 and place it onto the three-point support 24, while the suction elements 19 arranged in an arc-shaped arrangement can take up a lens blank 25 either from the three-point support 24 either from the top or from the bottom for placing it on the holding shaft (holder) 4. Thus, it is ensured that the guide rod 34 with the soft-elastic securing member 35 or the holding shaft 4 do not present obstacles during the course of placement of the lens blank. When it is ensured that a lens blank 25 can only be picked up when the pivot arm 33 has been pivoted out of the area of the lens blank 25 or when the holding shaft 4 has been extended such that a lens blank 25 can be positioned thereat with the aid of the suction head 18 by being first secured on only one side at the holding shaft 4, then it is possible to use only the suction head 18 provided at the head member 17. Such a measure simplifies the construction of the manipulation device 13 substantially.

Figure 3:
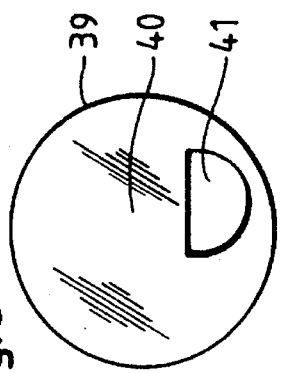
FIGS. 3–5 show lens blanks with different markings.
Figure 4:
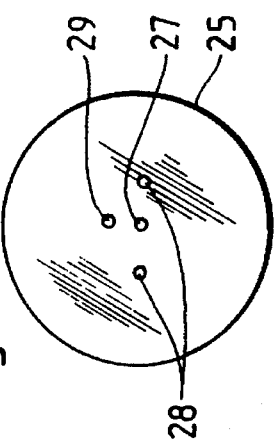

FIG. 3 shows a lens blank 39 with a reading portion 41. If it is assumed that the unmarked optical center point 40 corresponds to the geometric center point of the lens blank 39, the CCD camera 38 is able to detect the reading portion 41 and to determine the positioning relative to the optical-geometric center point of the lens blank 39. In this case, the reading portion 41 serves as a marking of the lens blank 39 which is detected by the opto-electronic detecting device 23 and which is transformed into signals for the manipulation device 13 for a position-exact insertion of the lens blank into the peripheral lens grinding machine. The four-point marking 27, 28, 29 of the lens blank 25 represented in FIG. 4 corresponds to the marking already explained in connection with FIG. 1 so that further detailed explanations are not provided.

Figure 5:
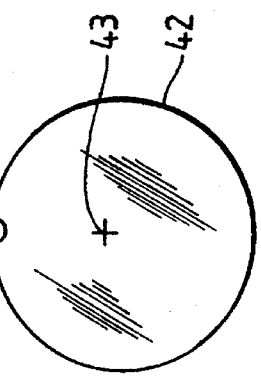

When a lens blank 42, as represented in FIG. 5, is provided with a marking of the optical center point in the form of a cross 43 as well as a notch 44 which is positioned with respect to a reading portion or the axis of a prismatic or cylindrical grinding, the marking as represented in FIG. 5 can also be used by the opto-electronic detecting device 23. Especially progressive lenses are often provided with markings as shown in FIG. 5.

The disclosed opto-electronic detecting device is provided with an electronic picture processing and evaluation system that provides such exact data for the control of the manipulation device 13 that the lens blank can be ground very exactly within the CNC lens grinding machine 1 and can be inserted without further processing into the respective spectacle frame according to whose specifications it has been ground. The decentralization values of the optical center point of the lenses with respect to the geometric center point of the spectacle openings in the spectacle frame, which values are to be determined by the optometrist for the respective wearer of the spectacles, can be taken into consideration by the CNC control device of the grinding machine 1 or by the manipulation device 13 in that it will place the lens blank into the grinding machine 1 not only angle-exact relative to the position of the axis of a cylindrical or prismatic grinding, respectively, the position of a reading portion, but also under consideration of the decentralization values. Thus, a calculation of the data of the lens shape with consideration of the decentralization values is not required.

The present invention is, of course, in no way restricted to the specific disclosure of the specification and drawings, but also encompasses any modifications within the scope of the appended claims.

What I claim is:

1. An apparatus for peripheral grinding of a lens; said apparatus comprising:
    at least one CNC-control device for grinding the lens blank according to a selected contour of the lens to be produced from the lens blank, said CNC-control device comprising:
        a) at least one grinding wheel,
        b) at least one rotatable holder for a lens blank,
        c) at least one input device for inputting the optical specifications of the lens to be produced, and
        d) a controller for controlling grinding of the lens blank according to the selected contour;
    at least one manipulation device for receiving and positioning the lens blank according to the optical specifications;
    an opto-electronic detecting device for detecting markings of the lens blank, said opto-electronic detecting device arranged in the vicinity of said manipulation device; and
    a first control unit, controlling said detecting device, and a second control unit, controlling said manipulation device, said first and said second control units cooperating for precisely positioning the lens blank on said holder.

2. An apparatus according to claim 1, wherein said opto-electronic detecting device comprises a holding device for the lens blank, a lighting device, and a CCD camera, wherein said CCD camera is connected to said first control unit and wherein said first control unit comprises an electronic picture processing and evaluating system cooperating with said second control unit.

3. An apparatus according to claim 2, wherein said opto-electronic detecting device further comprises:
    a housing with an opening, wherein said holding device is a three-point support connected to said opening so as to project from said housing and wherein said CCD camera is positioned in said housing and is aligned with said opening and said three-point support;

a support structure connected to said housing;

a pivot arm connected to said support structure;

a soft-elastic securing element for securing the lens blank at said three-point support, said soft-elastic securing element slidably connected to said pivot arm; and wherein said lighting device is an oblique illumination device.

4. An apparatus according to claim 1, wherein said manipulation device has a head member, moveable between said holder and said opto-electronic detecting device and comprising a plurality of suction elements that are positioned so as to form an arc-shaped arrangement.

5. An apparatus according to claim 4, wherein said manipulation device further comprises a vacuum source with suction lines connected to said suction elements, wherein at least six of said suction elements are provided and are positioned parallel to one another, wherein said suction elements are connected in pairs to a common one of said suction lines such that for each one of said pairs a maximum distance between said suction elements is provided, wherein said suction lines comprise sensors for activating said second control unit of said manipulation device for setting in motion said manipulation device when at least one of said pairs of suction elements contacts the lens blank.

6. An apparatus according to claim 1, wherein said manipulation device has a head member, moveable between said holder and said opto-electronic detecting device and comprising a suction head.

7. An apparatus according to claim 6, wherein said head member further comprises a plurality of suction elements that are positioned so as to form an arc-shaped arrangement, wherein said arc-shaped arrangement is rotatable about an axis of rotation and wherein said suction head is positioned perpendicular to said axis of rotation and is fixedly connected to said head member.

8. An apparatus according to claim 7, wherein said manipulation device further comprises a vacuum source with suction lines connected to said suction elements, wherein at least six of said suction elements are provided and are positioned parallel to one another, wherein said suction elements are connected in pairs to a common one of said suction lines such that for each one of said pairs a maximum distance between said suction elements is provided, wherein said suction elements comprise sensors for activating said second control unit of said manipulation device for setting in motion said manipulation device when at least one of said pairs of suction elements contacts the lens blank.

9. An apparatus according to claim 1, comprising at least one container for receiving the lens blanks, said container positioned within an operating range of said manipulating device.

10. An apparatus according to claim 9, comprising a transporting system for said at least one container.

11. An apparatus according to claim 9, wherein said container has a rest for receiving a horizontally oriented lens blank for a left lens and a rest for receiving a horizontally oriented lens blank for a right lens of a pair of glasses.

* * * * *